(12) United States Patent
Hayashi et al.

(10) Patent No.: US 8,831,876 B2
(45) Date of Patent: Sep. 9, 2014

(54) NAVIGATION DEVICE, ROUTE GUIDANCE METHOD, AND PROGRAM

(75) Inventors: Arata Hayashi, Kanagawa (JP); Naoki Shimizu, Kanagawa (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 13/518,591

(22) PCT Filed: Dec. 27, 2010

(86) PCT No.: PCT/JP2010/073622
§ 371 (c)(1),
(2), (4) Date: Aug. 31, 2012

(87) PCT Pub. No.: WO2011/081159
PCT Pub. Date: Jul. 7, 2011

(65) Prior Publication Data
US 2012/0316775 A1    Dec. 13, 2012

(30) Foreign Application Priority Data

Dec. 28, 2009 (JP) ................................. 2009-298075
Dec. 28, 2009 (JP) ................................. 2009-298076

(51) Int. Cl.
G01C 21/26     (2006.01)
(52) U.S. Cl.
USPC ....... 701/428; 701/423; 340/905; 340/995.19
(58) Field of Classification Search
USPC ................. 701/408, 423, 410, 428, 431, 533; 340/905, 995.19
See application file for complete search history.

(56) References Cited

U.S. PATENT DOCUMENTS

| 6,111,521 A * | 8/2000 | Mulder et al. ................ 340/905 |
| 8,306,730 B2 * | 11/2012 | Nishibashi et al. ........... 701/400 |
| 2001/0021895 A1 * | 9/2001 | Yamazaki ..................... 701/211 |
| 2003/0033080 A1 * | 2/2003 | Monde et al. ................. 701/201 |

(Continued)

FOREIGN PATENT DOCUMENTS

| JP | 2001-183159 A | 7/2001 |
| JP | 2007-86052 A | 4/2007 |
| JP | 2008-286671 A | 11/2008 |
| WO | WO 2008/068953 A1 | 6/2008 |

OTHER PUBLICATIONS

International Search Report with English translation dated Apr. 5, 2011 (three (3) pages).
Form PCT/ISA/237 (three (3) pages).

(Continued)

*Primary Examiner* — Calvin Cheung
*Assistant Examiner* — Courtney Heinle
(74) *Attorney, Agent, or Firm* — Crowell & Moring LLP

(57) ABSTRACT

Disclosed is technology for providing guidance in a manner that facilitates travel along a guidance route when there is a road which has a carpool lane. A navigation device (100) is provided with: a current-location calculation means for calculating the current location of a moving body; a recommended route search means for searching for a recommended route to a destination; a guidance-point setting means for setting a guidance point in the recommended route; and a guidance information notification means for notifying predetermined guidance information when a moving body reaches a set guidance point. When predetermined conditions are fulfilled, the guidance-point setting means sets in a road which has a carpool lane a guidance point for notifying information for guidance from said road to a branch road, before the guidance point that would be set in a road that does not have a carpool lane.

11 Claims, 13 Drawing Sheets

(56) References Cited

U.S. PATENT DOCUMENTS

| | | | |
|---|---|---|---|
| 2007/0050134 A1* | 3/2007 | Hayashida et al. | 701/209 |
| 2008/0033643 A1* | 2/2008 | Shimizu | 701/209 |
| 2008/0288163 A1* | 11/2008 | Asano | 701/118 |
| 2010/0063720 A1* | 3/2010 | Machino | 701/201 |
| 2011/0153200 A1* | 6/2011 | Tsuji et al. | 701/201 |
| 2011/0231088 A1* | 9/2011 | Nishibashi et al. | 701/201 |
| 2011/0288760 A1* | 11/2011 | Nishibashi et al. | 701/200 |
| 2011/0288761 A1* | 11/2011 | Nishibashi et al. | 701/200 |
| 2011/0288767 A1* | 11/2011 | Nishibashi et al. | 701/201 |
| 2012/0259539 A1* | 10/2012 | Sumizawa | 701/400 |
| 2012/0316775 A1* | 12/2012 | Hayashi et al. | 701/423 |
| 2013/0013203 A1* | 1/2013 | Sumizawa et al. | 701/533 |
| 2013/0030691 A1* | 1/2013 | Sumizawa et al. | 701/410 |
| 2013/0035858 A1* | 2/2013 | Sumizawa et al. | 701/533 |
| 2013/0103304 A1* | 4/2013 | Nishibashi et al. | 701/410 |
| 2013/0204520 A1* | 8/2013 | Nomura | 701/411 |

OTHER PUBLICATIONS

Japanese Office Action with English translation dated Feb. 13, 2014 (Eleven (11) pages).

* cited by examiner

FIG. 4

GUIDANCE POINT 400
INFORMATION

| GUIDANCE SEQUENCE | LINK ID | GUIDANCE POINT | GUIDANCE INFORMATION |
|---|---|---|---|
| 1 | * | (,**) | AUDIO DATA, IMAGE, ETC. |
| 2 | * | (,**) | INCLUDING "ENTRANCE", "EXIT", ETC., AS ATTRIBUTE INFORMATION |
| 3 | * | (,**) | |
| ⋮ | ⋮ | ⋮ | ⋮ |

GUIDANCE POINT 1400
INFORMATION

| GUIDANCE SEQUENCE (1411) | LINK ID (1412) | GUIDANCE POINT (1413) | GUIDANCE INFORMATION (1414) | 1415 |
|---|---|---|---|---|
| 1 | * * * | ( * *, * * ) | AUDIO DATA, IMAGE, ETC. | |
| 2 | * * * | ( * *, * * ) | INCLUDING "ENTRANCE", "EXIT", ETC., AS ATTRIBUTE INFORMATION | |
| 3 | * * * | ( * *, * * ) | | |
| ⋮ | ⋮ | ⋮ | ⋮ | |

NAVIGATION DEVICE, ROUTE GUIDANCE METHOD, AND PROGRAM

TECHNICAL FIELD

The present invention relates to a navigation device, a route guidance method, and a program. This application claims priority to Japanese Patent Applications No. 2009-298075 filed on Dec. 28, 2009 and Japanese Patent Applications No. 2009-298076 filed on Dec. 28, 2009, and in the designated countries where incorporation of documents by reference is approved, the contents described in the specifications of the aforementioned patent applications are incorporated into the present patent application by reference.

BACKGROUND ART

In recent years, carpooling is recommended, aimed at relieving traffic congestion. In addition, it is put into practice that a special lane is provided on a road, exclusively permitting a travel of a vehicle in which a specific number of passengers are riding. This type of lane is referred to as a carpool lane, HOV (High-Occupancy Vehicles) lane, or the like.

A conventional navigation device executes a predetermined route guidance, when a moving object is approaching an entry point or an exit point of the carpool lane (e.g., see Patent Document 1).

PRIOR ART DOCUMENT

Patent Document

Patent Document 1: Japanese Unexamined Patent Application Publication No. 2001-183159

DISCLOSURE OF THE INVENTION

Problem to be solved by the Invention

In the meantime, it is sometimes required to change lanes on a guided route (also referred to as a "recommended route") to enter a branch road, immediately after leaving the carpool lane. On this occasion, a situation that the lane change is not easily performed makes it difficult to travel along the guided route. By way of example, the case where a highway exit and a carpool lane exit are located too close may cause abrupt steering (or failing to change lanes in time), when headed for the highway exit from the carpool lane exit after traveling the carpool lane.

In addition, it is sometimes required to change lanes on a guided route to enter the carpool lane, immediately after merging with traffic on the road where the carpool lane is provided. Also on this occasion, the situation that the lane change is not easily performed makes it difficult to travel along the guided route. By way of example, the case where a highway entrance and a carpool lane entrance are located too close may cause abrupt steering (or failing to change lanes in time), when headed for the carpool lane entrance immediately after entering the highway.

It is sometimes required to use the carpool lane on a guided route only for a short period (a short distance). On this occasion, it is necessary to change lanes over and over, within a short distance section, along with entering the carpool lane and leaving from the carpool lane. Since a driving operation with such repeated lane change in the short distance section as described above is not easily performed, traveling along the guided route becomes difficult.

An object of the present invention is to provide a technique to perform guidance which facilitates traveling along the guided route, even in the case where there is a road having the carpool lane.

Means to Solve the Problem

In order to solve the problem above, a navigation device relating to a first embodiment of the present invention is provided with; a recommended route search unit configured to searching for a recommended route to a destination, a guidance point setting unit configured to setting a guidance point on the recommended route, and a guidance information announcing unit configured to announcing predetermined guidance information, when a moving object reaches the guidance point being set, wherein, in the case where a predetermined condition is satisfied on a road provided with a carpool lane, the guidance point setting means sets the guidance point for announcing the guidance information from the road to a branch road, at a position before the guidance point that is supposed to be set on a road not provided with the carpool lane.

In addition, the navigation device relating to the first embodiment of the present invention is provided with; a current location calculation unit configured to calculating a current position of a moving object, a recommended route search unit configured to searching for a recommended route to a destination, a guidance point setting unit configured to setting a guidance point on the recommended route, and a guidance information announcing unit configured to announcing predetermined guidance information when a moving object reaches the guidance point being set, wherein, in the case where a predetermined condition is satisfied on a road provided with a carpool lane, the guidance point setting means sets the guidance point for announcing the guidance information for guidance to the carpool lane, at a position before the guidance point that is supposed to be set on a road not provided with the carpool lane.

In addition, the navigation device relating to a second embodiment of the present invention is provided with; a current location calculation unit configured to calculating a current position of a moving object, a recommended route search unit configured to searching for a recommended route to a destination, a guidance point setting unit configured to setting a guidance point on the recommended route, and a guidance information announcing unit configured to announcing predetermined guidance information when a moving object reaches the guidance point being set, wherein, the guidance point setting means configures a setting, when a distance from a merging point to a branching point on the road where the carpool lane is provided is shorter than a predetermined distance, in such a manner that guidance information is not announced at the guidance point being set for announcing the guidance information to guide to the carpool lane.

BRIEF DESCRIPTION OF DRAWINGS

FIG. 4 illustrates a schematic data structure of guidance point information relating to the first embodiment.

FIG. 11 illustrates a schematic data structure of guidance point information relating to the second embodiment;

PREFERRED EMBODIMENTS FOR CARRYING OUT THE INVENTION

First Embodiment

Hereinafter, one example of the first embodiment of the present invention will be explained, with reference to the accompanying drawings.

Figure 1:
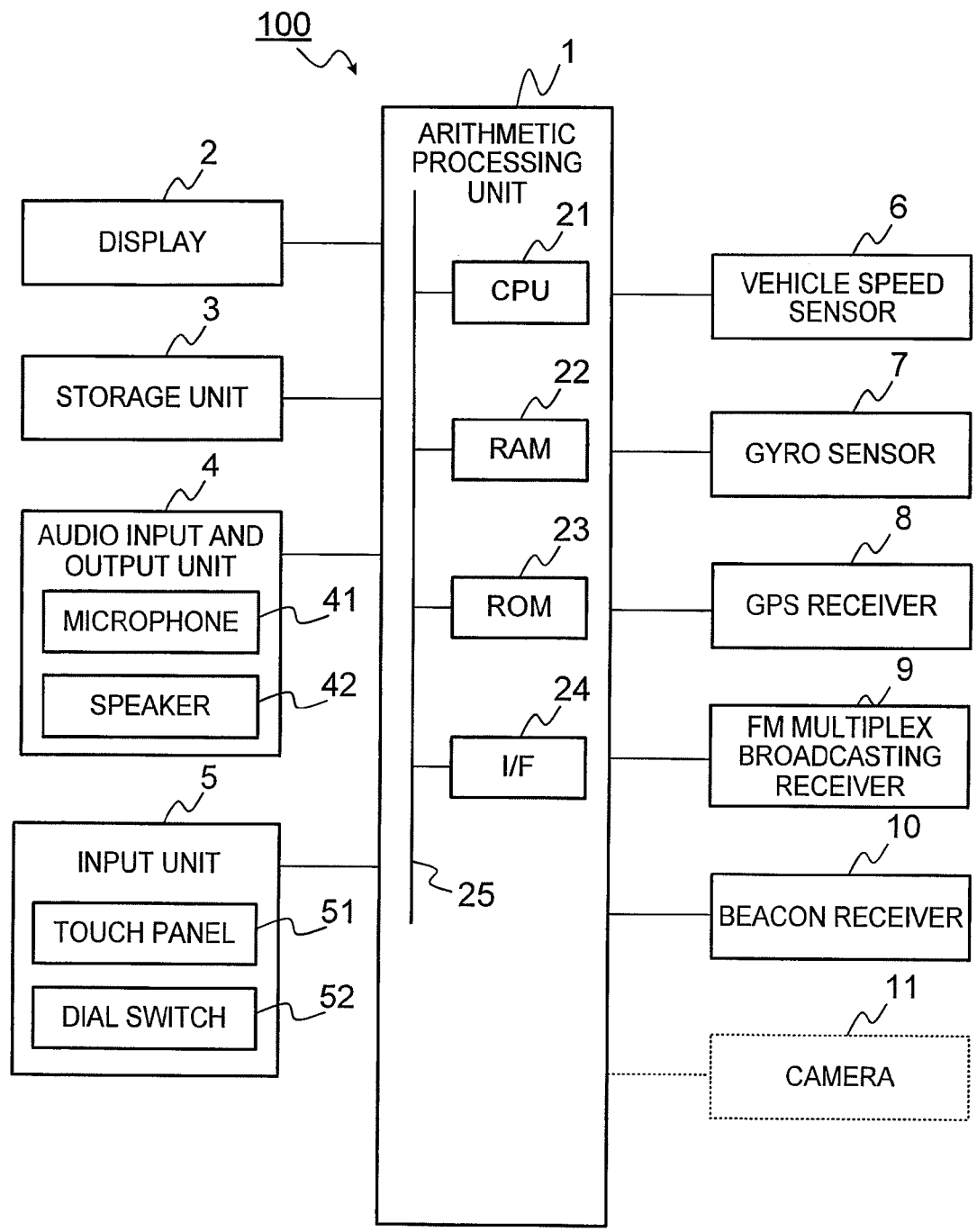
FIG. 1 is a schematic block diagram showing a navigation device relating to a first embodiment.

FIG. 1 is a schematic block diagram showing a navigation device 100 relating to the first embodiment of the present invention. As illustrated, the navigation device 100 is provided with an arithmetic processing unit 1, a display 2, a storage unit 3, an audio input and output unit 4 (a microphone 41 and a speaker 42), an input unit 5 (a touch panel 51 and a dial switch 52), a vehicle speed sensor 6, a gyro sensor 7, a GPS receiver 8, an FM multiplex broadcasting receiver 9, and a beacon receiver 10. The navigation device 100 may be a car navigation device mounted on a vehicle, or a portable terminal such as a mobile phone and a PDA.

The arithmetic processing unit 1 is a main unit for performing various processing. By way of example, the arithmetic processing unit 1 includes a CPU (Central Processing Unit) 21 for executing various processing such as numerical processing and a control of each device, RAM (Random Access Memory) 22 for storing map data and operation data being read from the storage unit 3, ROM (Read Only Memory) 23 for storing programs and data, an I/F (interface) 24 for establishing connection between the arithmetic processing unit 1 and various hardware. Then, the arithmetic processing unit 1 has a configuration that one device is connected to another mutually via a bus 25. Functional parts (101 to 106) described below are implemented by executing programs which the CPU 21 reads into a memory such as the RAM 22.

By way of example, the arithmetic processing unit 1 calculates a current position based on information outputted from various sensors (6, 7) and from the GPS receiver 8. On the basis of the current position being obtained, the arithmetic processing unit 1 reads out from the storage unit 3, map data necessary to create a display. Furthermore, the arithmetic processing unit 1 graphically expands the map data being read out, and displays the data on the display 2 in such a manner as superimposing thereon a current position mark (or a moving object mark representing a position of the moving object). The arithmetic processing unit 1 uses the map data stored in the storage unit 3 to retrieve an optimum route (hereinafter, referred to as a "recommended route") connecting a departure place (or the current position calculated in the arithmetic processing unit 1) with a destination, which are designated by the user. It further uses the speaker 42 of the audio input and output unit 4 and the display 2 to guide the user.

The display 2 is a unit for displaying the graphics information generated by the arithmetic processing unit 1. The display 2 is made up of a liquid crystal display or an organic EL (Electro-Luminescence) display.

The storage unit 3 is made up of a storage medium such as a CD-ROM, a DVD-ROM, an HDD, and an IC card. This storage medium stores map data 310, audio data, video data, and the like, for instance.

Figure 2:
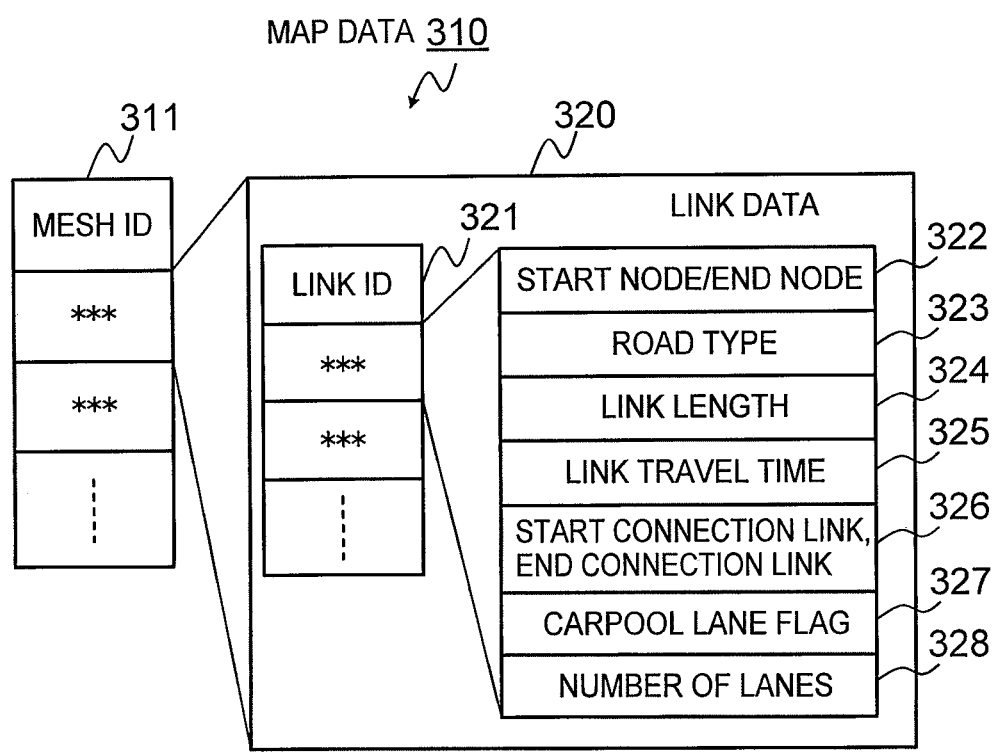
FIG. 2 illustrates a schematic data structure of map data relating to the first embodiment.

FIG. 2 illustrates a schematic data structure of the map data 310. As illustrated, the map data 310 includes link data 320 with respect to each identification code (mesh ID) 311 indicating a mesh being a region partitioned on the map, the link data representing each link constituting a road included in the mesh region.

The link data 320 includes with respect to each link identification code (link ID) 321, coordinate information 322 of two nodes (a start node and an end node) constituting the link, a road type 323 indicating type information of the road including the link, link length information 324 indicating a length of the link, a link travel time 325, identification codes of links respectively connecting to the two nodes (connection link IDs) 326, a carpool lane flag 327 indicating whether or not the road including the link is a carpool lane (or a road along which the carpool lane is provided), the number of lanes 328 indicating how many lanes are provided on the road including the link, and the like. It is to be noted here that there is a distinction between the start node and the end node being the two nodes constituting a link, thereby allowing up-line and down-line of the road to be managed as links different from each other.

Here, referring to FIG. 1 again, the audio input and output unit 4 is provided with the microphone 41 as an audio input unit, and the speaker 42 as an audio output unit. The microphone 41 captures voice, or the like, outputted from a driver and other passengers. The speaker 42 outputs an audio signal generated by the arithmetic processing unit 1. The microphone 41 and the speaker 42 are separately mounted on predetermined portions of the vehicle.

The input unit 5 is a unit for accepting directive from the user. The input unit 5 is made up of the touch panel 51, the dial switch 52, and other hard switches (not illustrated) such as a scroll key and a scaling key. The input unit 5 further includes a remote controller which is capable of remotely providing an operation instruction to the navigation device 100. The remote controller is provided with a dial switch, a scroll key, a scaling key, and the like, allowing information obtained by operating each of the keys and switches to be transmitted to the navigation device 100.

The touch panel 51 is an operation panel being a transparent type, to be attached on a display surface of the display 2. The touch panel 51 is used to specify a touch position in association with XY coordinates of the image displayed on the display 2, convert the touch position to coordinates, and output the coordinates. The touch panel 51 is made up of pressure-sensitive type or electrostatic type input detecting elements, or the like.

The dial switch 52 is constructed in rotatable manner, both in the clockwise direction and in the anti-clockwise direction, issues a pulse signal according to a rotation by a predetermined angle, and outputs the pulse signal to the arithmetic processing unit 1. The arithmetic processing unit 1 obtains a rotation angle of the dial switch 52 based on the number of the pulse signals.

The vehicle speed sensor 5, the gyro sensor 7, and the GPS receiver 8 are used to detect a current position (location of one's own vehicle) and the like, of a moving object (the navigation device 100). The vehicle speed sensor 6 is a sensor for outputting vehicle speed data that is used to calculate a vehicle speed. The gyro sensor 7 is made up of an optical fiber gyroscope, a vibrating gyroscope, or the like, to detect an angular rate according to rotation of the moving object. The GPS receiver 8 receives a signal from a GPS satellite, measures a distance between the moving object and the GPS satellite and a rate of change of the distance, with respect to at least three satellites, thereby obtaining the current position and a traveling speed of the moving object.

The FM multiplex broadcasting receiver 9 receives an FM multiplex broadcasting signal that is transmitted from an FM multiplex broadcasting station. The FM multiplex broadcasting information includes brief current traffic information according to the VICS (Vehicle Information Communication System: registered trademark), information on restrictions, SA/PA (service area/parking area) information, parking lot information, and the like, and character information and the like, such as weather information, provided by a radio station as FM multiplex general information.

The beacon receiver 10 receives traffic congestion information, information on restrictions, SA/PA information, parking lot information, and the like, transmitted from beacons.

Figure 3:
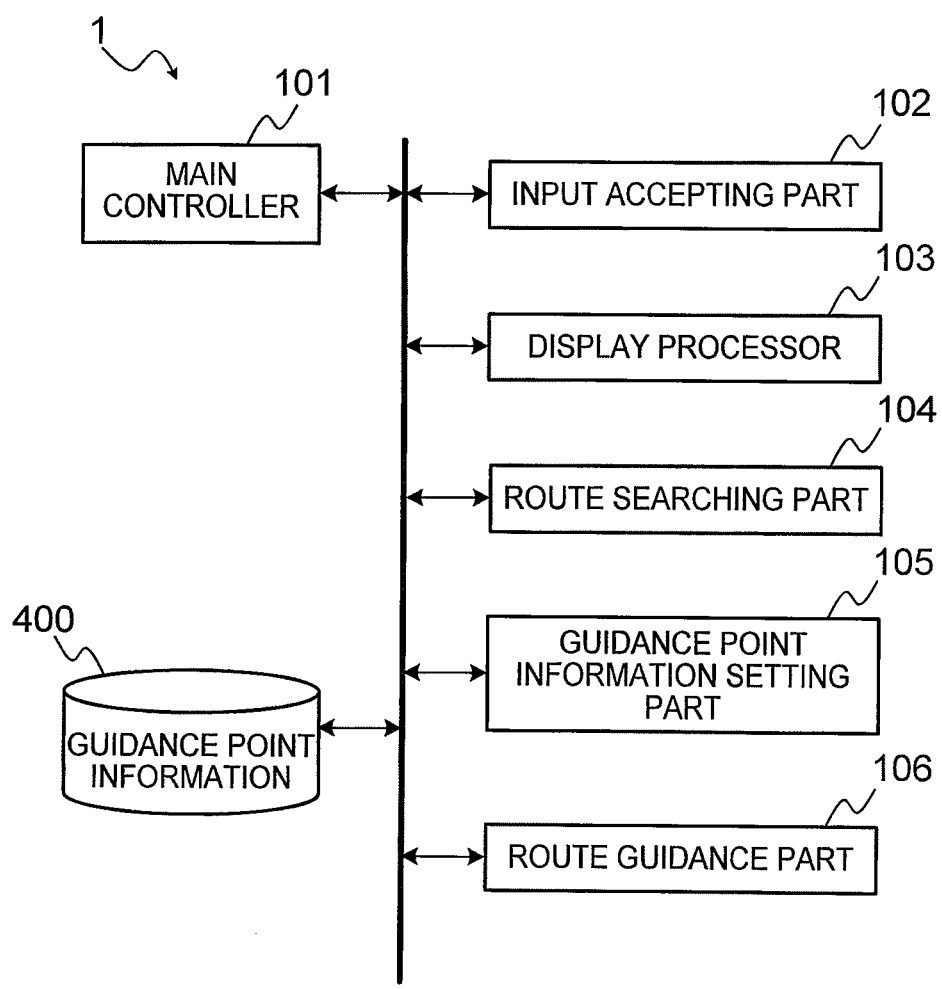
FIG. 3 is a functional block diagram of an arithmetic processing unit relating to the first embodiment.

FIG. 3 is a functional block diagram of the arithmetic processing unit 1. As illustrated, the arithmetic processing unit 1 includes a main controller 101, an input accepting part 102, a display processor 103, a route searching part 104, a guidance point information setting part 105, and a route guidance part 106.

The main controller 101 performs processing for overall control of each of the parts in the arithmetic processing unit 1. The main controller 101 manages various setting information provided in the navigation device 100. By way of example, the main controller 101 accepts from the user, via the input accepting part 102, information to be set as the various setting information, and stores the information at a predetermined position in the storage unit 3. It is to be noted that the main controller 101 accepts as the various setting information, information relating to usage of the carpool lane (e.g., a true or false result regarding positive usage of the carpool lane), and stores the result in the storage unit 3. Upon accepting a request to provide the various setting information from other unit, the main controller 101 transfers the various setting information to the unit which sent the request.

The input accepting part 102 accepts a request from the user, inputted in the input unit 5, analyzes descriptions of the request, and notifies the main controller 101 of the data responding to the result of the analysis. For example, the input accepting part 102 accepts a request for power-on or power-off of the navigation device 100, and notifies the main controller 101 of the request. The input accepting part 102 further accepts input data regarding settings of various functions (e.g., setting of a departure place and a destination) held by the navigation device 100, and notifies the main controller 101 of the input data.

The display processor 103 displays on the display 2, a map, a recommended route being retrieved, various messages given to the user, and the like. Specifically, the display processor 103 generates a drawing command to make a display on the display 2 and it is notified. It is to be noted that, upon displaying the map on the display 2, the display processor 103 extracts from the storage unit 3, the map data of the area requested to be displayed (for example, an area necessary for displaying the entire recommended route), generates a map command in a designated drawing format, so as to depict roads, other map structural objects, the current position, the destination, the recommended route, and the like, and notifies the main controller 101 of the map command. The display processor 103 further generates a command to display a vehicle mark indicating the position of the vehicle, various setting screens, or the like, on the map being displayed on the display 2, and notifies the main controller 101 of the command.

The route searching part 104 performs a process for searching for a recommended route. Then, the route searching part 104 retrieves a route which minimizes cost of the route (e.g., total distance and total travel time) connecting designated two points (the departure place and the destination), by using Dijkstra's Algorithm or the like. On this occasion, the route searching part 104 stores in the memory such as the RAM 22, an identification code (link ID) 321 of each link that constitutes the recommended route being retrieved, establishing associations between the link IDs and the links respectively.

The guidance point information setting part 105 configures a setting as to a point (hereinafter referred to as "guidance point") for outputting guidance information to guide the moving object (vehicle). Specifically, the guidance point information setting part 105 generates guidance point information 400 regarding the guidance point, after retrieving the route and prior to guiding along the route, and stores the guidance point information in the memory such as the RAM 22. It is to be noted that setting of the guidance point performed for the first time after retrieving the route will be referred to as "initial setting" in the following.

FIG. 4 illustrates a schematic data structure of the guidance point information 400. As illustrated, the guidance point information 400 is made up of a record 415 with respect to each guidance point 413. Each record 415 stores a guidance sequence 411, a link ID 412, a guidance point 413, and guidance information 414, in such a manner as establishing association among those items.

Here, the guidance sequence 411 is data indicating the sequence for outputting the guidance information 414 on the recommended route, from the departure place or the current position to the destination on the recommended route. The link ID 412 is an identification code of the link on which the guidance point 413 is located. The guidance point 413 represents coordinate data which specifies a position of the guidance point. The guidance information 414 includes audio data or image data, and it is data used for outputting a message such as "You will be soon arriving at the expressway exit". There is further stored for the guidance information 414, as attribute information, character data such as "entrance" and "exit", being associated data.

The guidance point information setting part 105 changes the guidance point 413 being a target for the change, in the situation where the change of lanes is not easy on the road where the carpool lane is provided. Specific processing regarding the change of the guidance point 413 (guidance point change process) will be explained later.

The route guidance part 106 performs the route guiding using the recommended route retrieved by the route searching part 104. By way of example, the route guidance part 106 displays (highlights) the recommended route included in the range of the map shown on the display 2 via the display processor 103. On this occasion, the route guidance part 106 displays on the recommended route, a moving object mark (car mark) indicating the current position of the moving object (vehicle).

The route guidance part 106 outputs (displays, or outputs using sounds) predetermined guidance information, every time when the moving object reaches the guidance point being set. Specifically, when the current position coincides (or approximately coincides) with the guidance point 413 stored in the guidance point information 400, the route guidance part 106 outputs the guidance information 414 which is associated with the guidance point 413. Accordingly, the route guidance part 106 is allowed to show on the display 2 and inform the user using sounds via the speaker 42 of the audio input and output device 4, whether the user should go straight, or turn to the left or to the right, before (e.g., 300 meters before) passing a point requiring the guidance (e.g., a major intersection, a point for entering the carpool lane, a branching point of an expressway, or the like).

Next, an explanation will be made as to a characteristic operation of the navigation device 100 having the configuration as described above.

<Guidance Point Change Process>

Figure 5:
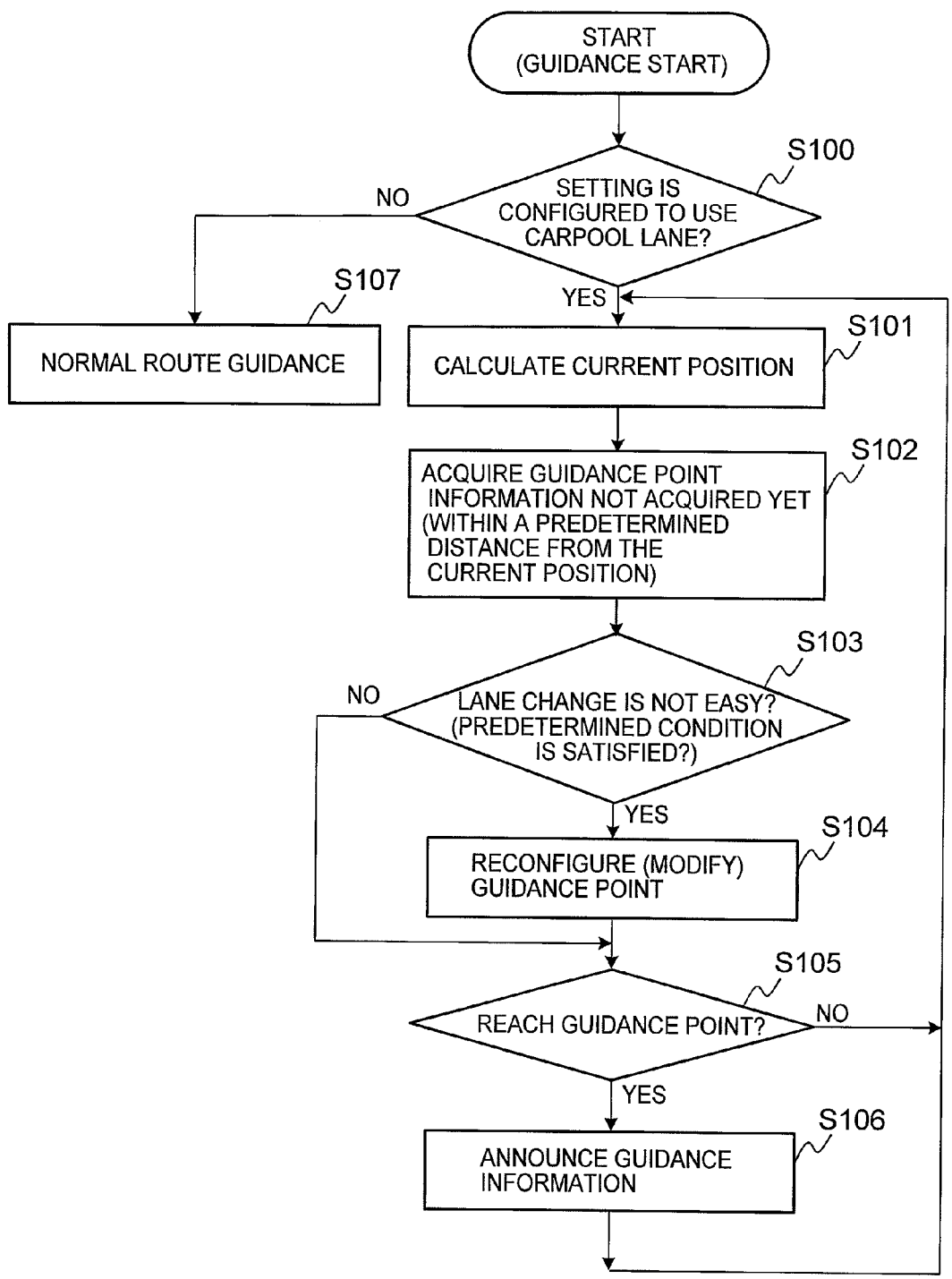
FIG. 5 is a flow chart showing a guidance point change process relating to the first embodiment.

FIG. 5 is a flow chart showing the guidance point process performed by the navigation device 100.

The guidance point information setting part 105 of the arithmetic processing unit 1 starts the guidance point change process at the timing when the route guiding part 106 starts the route guidance, for instance.

Firstly, the route guidance part 106 determines whether or not there is a setting to use the carpool lane in the navigation device 100 (step S100). Specifically, the route guidance part 106 acquires from the main controller 101, information about how to use the carpool lane (e.g., information of a true or false result being set regarding the usage of the carpool lane), out of various setting information provided in the navigation device 100. Then, if the acquired information includes information indicating the carpool lane is to be used (true), the route guidance part 106 determines that there is a setting that the carpool lane is used. On the other hand, if the acquired information includes information indicating the carpool lane is not used (false), the route guidance part 106 determines that there is a setting the carpool lane is not used.

Upon determining that there is a setting that the carpool lane is used (step S100; Yes), the route guidance part 106 shifts the process to the step S101. On the other hand, if the route guidance part 106 determines that there is a setting that the carpool lane is not used (step S100; No), the process shifts to the step S107, and normal route guidance is performed (under the condition that the carpool lane is not used).

When the process shifts to the step S101, the route guidance part 106 calculates the current position of the moving object (vehicle) (step S101). By way of example, the route guidance part 106 uses vehicle speed data outputted from the vehicle speed sensor 6, an angular rate detected by the gyro sensor 7, and the like, so as to calculate the current position of the moving object. The route guidance part 106 further uses data outputted from the GPS receiver 8 to modify the current position.

Then, the guidance point information setting part 105 acquires the guidance point information (record 415) of the guidance point which exists within a predetermined distance from the current position and not acquired yet (step S102). By way of example, the guidance point information setting part 105 refers to the guidance point information 400, and specifies a record 415 having the guidance point 413 within a predetermined distance (e.g., 3 km) from the current position that is calculated in the step S101. Then, the guidance point setting information setting part 105 reads the record 415 not acquired yet (not read out into the memory such as the RAM 22), out of the records 415 being specified. It is to be noted that the guidance point information setting part 105 reads the record 415 according to the sequence indicated by the guidance sequence 411.

Next, the guidance point information setting part 105 determines the current situation, whether or not the change of lanes is not easy on the road where the carpool lane is provided (step S103).

Figure 6:
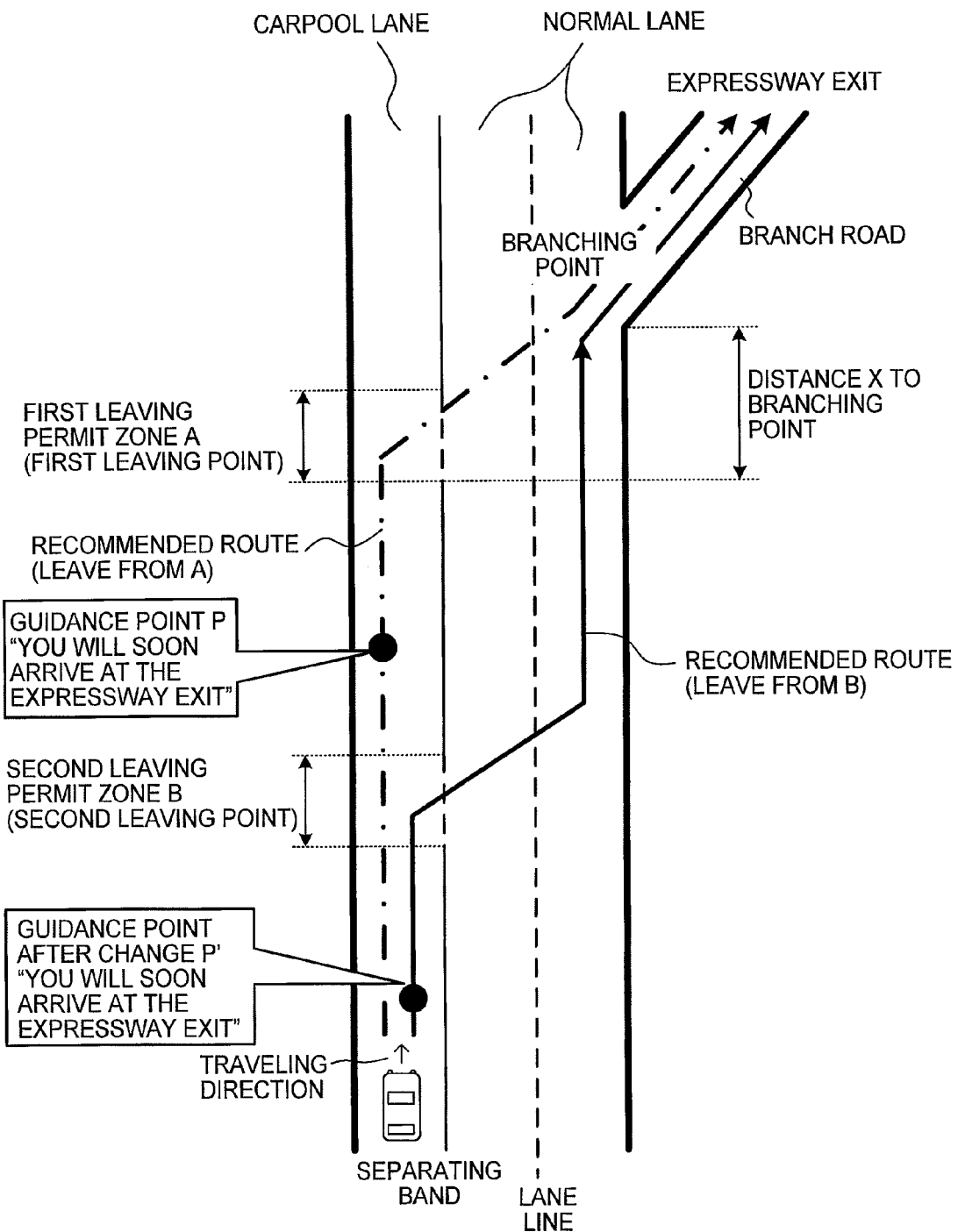
FIG. 6 is a schematic diagram showing an expressway (in the vicinity of an expressway exit) where a carpool lane is provided.

FIG. 6 is a schematic diagram showing an expressway (in the vicinity of an expressway exit) where the carpool lane is provided. In the illustrated example, one carpool lane is provided in such a manner as parallel with two lanes (normal lanes) on the expressway. Here, the carpool lane and the normal lanes are separated by a separating band. Therefore, the vehicle traveling along the carpool lane is allowed to leave the carpool lane, only from a particular zone. By way of example, the zone which permits the vehicle to leave the carpool lane for the normal lane is provided for each expressway exit, at multiple points (leaving permit zone A and leaving permit zone B).

Here, in the situation where the change of lanes on the normal lanes is easy, it is possible to leave the carpool lane from the leaving permit zone A which is close to the expressway exit, and enter the branch road directed to the expressway exit. However, in the situation where the change of lanes on the normal lanes is not easy, there is a possibility of failing to enter the branch road directed to the expressway exit, if the moving object leaves the carpool lane from the leaving permit zone A which is close to the expressway exit.

The guidance point 413 being determined in the initial setting is set at the position a predetermined distance (e.g., 300 m) before a point which requires guidance (e.g., an intersection), irrespective of whether or not the road is provided with the carpool lane. Therefore, if the guidance information 414 is outputted at the guidance point 413 which is determined according to the initial setting, the moving object is allowed to leave the carpool lane from the leaving permit zone A only, and eventually, it may fail to enter the branch road ahead.

Therefore, the guidance point information setting part 105 according to the present embodiment shifts the process to the step S104 and changes the guidance point P set in the initial setting to a point on the nearer side (guidance point P' which is obtained after the change), in the situation where the change of lanes on the road having the carpool lane is not easy. On the other hand, in the situation where the change of lanes on the road having the carpool lane is easy, the guidance point P is not changed, and the process shifts to the step S105.

Hereinafter, a specific process in the step S103 will be explained.

The guidance point information setting part 105 determines that the situation indicates the lane change is not easy, when a predetermined condition is satisfied. On the other hand, if the predetermined condition is not satisfied, it is determined that the situation indicates that the lane change is easy.

Here, the predetermined condition is assumed to be any one of the followings; "the first condition", "the second condition", and "the third condition". It is to be noted the predetermined condition may be a combination of each of the conditions (the first condition, the second condition, and the third condition). By way of example, two or more conditions out of "the first condition", "the second condition", and "the third condition" may be assumed as the predetermined condition.

<First Condition>

Distance X from the first leaving permit zone (first leaving point) A to the branching point as shown in FIG. 6 is shorter than a predetermined distance (e.g., 500 m).

<Second Condition>

The number of lanes on the expressway (normal lanes) is equal to or more than a predetermined number (e.g., 3 lanes).

<Third Condition>

Traffic on the expressway (normal lanes) is congested.

In other words, the guidance point information setting part 105 refers to the carpool lane flag 327 of the link data 320 to specify a carpool lane link, and by using this link, calculates the distance X from the first leaving permit zone (first leaving point) A to the branching point. Then, if the first condition is satisfied, it is determined that the predetermined condition is satisfied.

In addition, the guidance point information setting part 105 refers to the carpool lane flag 327 and the number of lanes 328 of the link data 320, and specifies the number of lanes on the road (expressway) which is provided with the carpool lane. Then, if the second condition is satisfied, it is determined that the predetermined condition is satisfied.

In addition, the guidance point information setting part 105 uses the FM multiplex broadcasting receiver 9 and the beacon receiver 10 to acquire traffic congestion information (including restriction information) within an area (e.g., an area including from the departure place to the destination) which is a target for the route search. With this, the guidance point information setting part 105 refers to the carpool lane flag 327 of the link data 320, and specifies a carpool lane link. Then, the guidance point information setting part 105 uses the traffic congestion information being acquired and the link being specified to determine whether or not traffic on the road (expressway) provided with the carpool lane is congested. In the case where the third condition is satisfied, it is determined that the predetermined condition is satisfied.

When the process shifts to the step S104, the guidance point information setting part 105 changes the guidance point P being set in the initial setting (step S104). By way of example, the guidance point information setting part 105 searches the guidance point information (records 415) acquired in the step S102, for the guidance information 414 including character data "exit" as attribute information. Then, the guidance point information setting part 105 specifies the guidance point 413 associated with the guidance information 414 being retrieved, as a guidance point targeted for the change. Then, the guidance point information setting part 105 changes the specified guidance point 413 targeted for the change to a point before the point being set in the initial setting (i.e., the position being back by a predetermined distance, facing to the destination of the guided route).

After the guidance point 413 is changed, the guidance point information setting part 105 shifts the process to the step S105.

When the process shifts to the step S105, the route guidance part 106 determines whether or not the moving object (vehicle) has reached the guidance point (step S105). By way of example, the route guidance part 106 compares the current position calculated in the step S101 with the already-set guidance point (the guidance point 413 stored in the guidance point information 400). Then, if the current position coincides with (approximately coincides with) the guidance point, it is determined that the moving object has reached the guidance point. On the other hand, if the current position does not coincide with the guidance point, it is determined that the moving object has not reached the guidance point yet.

If it is determined that the moving object has not reached the guidance point (step S105; No), the route guidance part 106 returns the processing to the step S101. On the other hand, when it is determined that the moving object has reached the guidance point, the route guidance part 106 shifts the process to the step S106 (step S105; Yes).

When the process shifts to the step S106, the route guidance part 106 announces the user the guidance information regarding the guidance point which the moving object has reached (step S106). Specifically, the route guidance part 106 reads the guidance information 414 being associated with the guidance point 413 which the moving object has reached, and shows the information on the display 2 together with an audio output from the speaker 42.

Then, route guidance part 106 returns the process to the step 101. Subsequently, the arithmetic processing unit 1 repeatedly executes the flow described above, until the route guidance is completed.

The arithmetic processing unit 1 executes the processing above, thereby allowing the navigation device 100 according to the present embodiment to change the guidance point P set in the initial setting to a point before P (guidance point P' after the change), as shown in FIG. 6. In addition, at the guidance point P' after the change, it is possible to form guidance such as the message "You will be soon arriving at the expressway exit". As a result, the moving object (vehicle) is allowed to leave the carpool lane from the second leaving permit zone (the second leaving point) B well in advance, and enter the branch road ahead.

It is to be noted that the present invention is not limited to the aforementioned first embodiment, but various modifications and applications are available.

By way of example, in the first embodiment described above, an explanation has been made as to the processing to change the guidance point in the vicinity of the expressway exit. However, the present invention is not limited to this example. It is also possible to change the guidance point in the vicinity of the expressway entrance.

Figure 7:
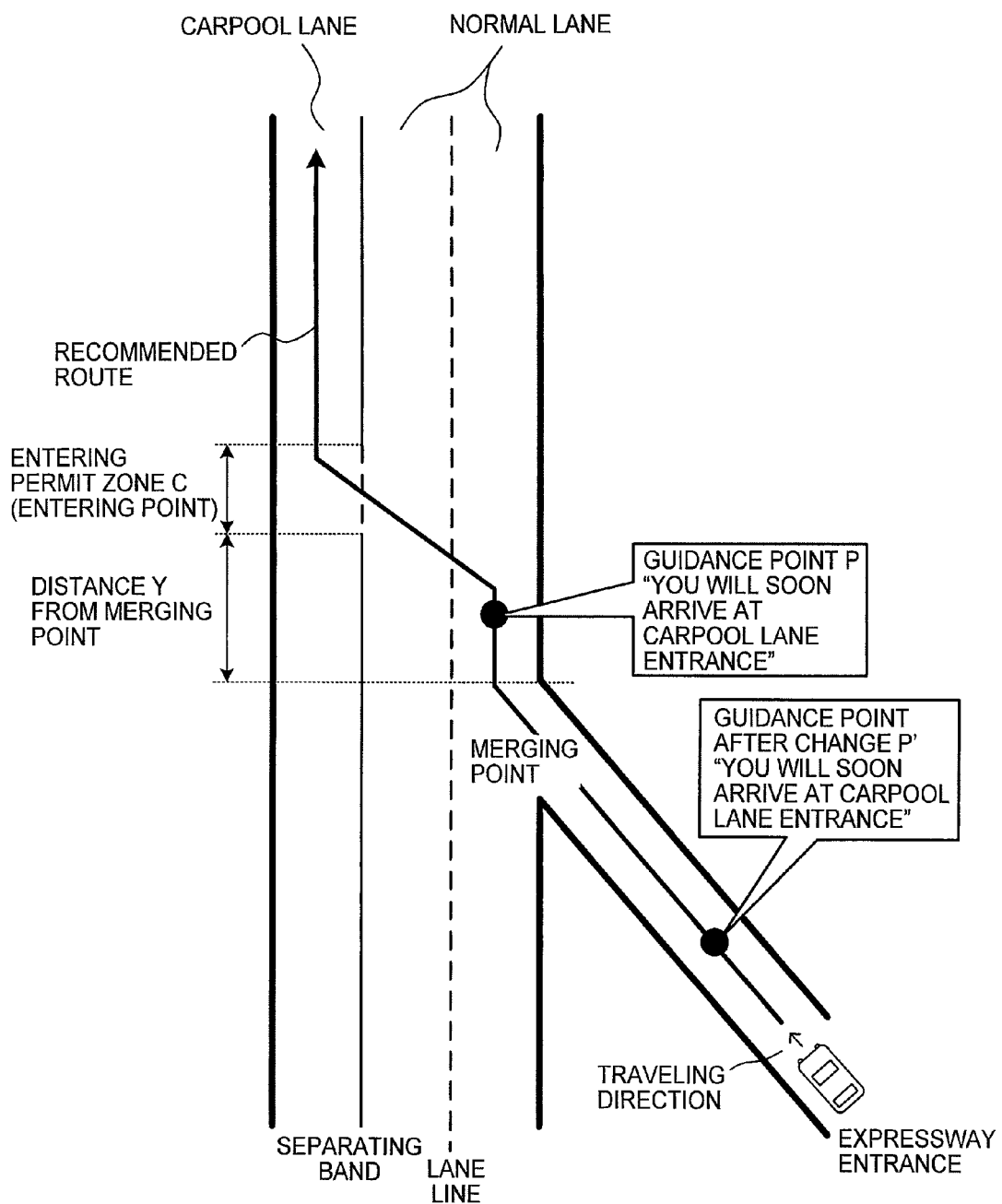
FIG. 7 is a schematic diagram showing an expressway (in the vicinity of an expressway entrance) where the carpool lane is provided.

FIG. 7 is a schematic diagram showing an expressway (in the vicinity of an expressway entrance) where the carpool lane is provided. In the example as illustrated, similar to the first embodiment, one carpool lane is provided in such a manner as parallel with two lanes (normal lanes) on the expressway. Here, the carpool lane and the normal lanes are separated by a separating band. Therefore, the vehicle is allowed to enter the carpool lane, only from a particular zone. By way of example, a zone which permits the vehicle to enter the carpool lane from the normal lane is provided at least one, for each expressway entrance (entering permit zone C).

Here, in the situation where the lane change on the normal lanes is easy, it is possible to merge with the traffic on the normal lane (expressway) and thereafter guidance is performed to the carpool lane, so as to enter the carpool lane. However, in the situation where the lane change on the normal lanes is not easy, there is a possibility of failing to enter the carpool lane, if guidance to the carpool lane is performed after merging with the traffic on the normal lane (expressway).

In addition, as described above, the guidance point 413 configured in the initial setting is set at the position a predetermined distance (e.g., 300 m) before a point (an intersection, or the like) which needs guidance, irrespective of whether or not the road is provided with the carpool lane. Therefore, when the guidance information 414 is outputted at the guidance point 413 configured in the initial setting, there is a possibility that guidance to enter the carpool lane is performed after merging with the traffic on the normal lane.

Considering this situation, the guidance point information setting part 105 performs the processing of the steps S103 and S104 according to the first embodiment as the following.
(Step S103)

If a predetermined condition is satisfied, the guidance point information setting part 105 determines that the situation indicates the lane change is not easy. On the other hand, if the predetermined condition is not satisfied, it is determined that the situation indicates the lane change is easy.

Here, the predetermined condition is assumed as any one of the following conditions, "the fourth condition", "the fifth condition", and "the sixth condition". It is to be noted that the predetermined condition may be a combination of each of the conditions (the fourth condition, the fifth condition, and the sixth condition). By way of example, it may correspond to two or more of "the fourth condition", "the fifth condition", and "the sixth condition".
<Fourth Condition>

Distance Y from the merging point with the expressway (normal lane) to the entering permit zone (entering point) C shown in FIG. 7 is shorter than a predetermined distance (e.g., 500 m).
<Fifth Condition>

The number of lanes on the expressway (normal lane) is equal to or more than a predetermined number (e.g., 3 lanes).
<Sixth Condition>

Traffic on the expressway (normal lane) is congested.

In other word, the guidance point information setting part 105 refers to the carpool lane flag 327 of the link data 320 to specify a carpool lane link, and uses this link to calculate the distance Y from merging point with the expressway (normal lane) to the entering permit zone (entering point) C. Then, if the fourth condition is satisfied, it is determined that the predetermined condition is satisfied.

In addition, the guidance point information setting part 105 similarly refers to the carpool lane flag 327 and the number of lanes 328 of the link data 320, and specifies the number of lanes on the road (expressway) where the carpool lane is provided. Then, if the fifth condition is satisfied, it is determined that the predetermined condition is satisfied.

In addition, the guidance point information setting part 105 utilizes the FM multiplex broadcasting receiver 9 and the beacon receiver 10, or the like, to acquire traffic congestion information (including restriction information, and the like) of an area (e.g., the area including from the departure place to the destination) which is a target for the route search. With this processing above, the guidance point information setting part 105 refers to the carpool lane flag 327 of the link data 320 and specifies a carpool lane link. Then, by using the traffic congestion information being acquired and the link being specified, the guidance point information setting part 105 determines whether or not traffic on the road (expressway) provided with the carpool lane is congested. When the sixth condition is satisfied, it is determined that the predetermined condition is satisfied.
(Step S104)

If the situation indicates that the lane change is not easy, the guidance point information setting part 105 changes the guidance point P configured in the initial setting, to a point on the nearer side (the guidance point P' after the change).

Specifically, the guidance point information setting part 105 searches the guidance point information (records 415) acquired in the step S102, for the guidance information 414 having character data indicating "entrance" as the attribute information. The guidance point information setting part 105 specifies the guidance point 413 associated with the retrieved guidance information 414, as a guidance point targeted for the change. Here, the guidance point information setting part 105 changes the specified guidance point 413 targeted for the change to a point before the point set in the initial setting (i.e., the point being back by a predetermined distance, facing to the destination of the guided route).

The guidance point information setting part 105 executes the processing above (steps S103 and S104), thereby allowing the navigation device 100 according to the first embodiment to change the guidance point P configured in the initial setting, to the point before the point P (the guidance point P' after the change). Then, at the guidance point P' after the change, it is possible to perform guidance, for example, "You will soon arrive the carpool lane entrance". As a result, the moving object (vehicle) is allowed to enter the carpool lane from the entering permit zone (the entering point) C in good time.

In addition, the first embodiment described above has been explained, assuming an expressway as the road where the carpool lane is provided. However, the present invention is not limited to this example. By way of example, the road where the carpool lane is provided may be a normal road.

Further in the first embodiment above, the branching point is assumed as a point directing to an exit of the expressway (normal lane) (an expressway exit). However, the present invention is not limited to this example. By way of example, the branching point may be a junction, an intersection, or the like.

Similarly, the merging point according to the first embodiment may be a junction, an intersection, or the like.

Further in the first embodiment above, the carpool lane and the normal lane are separated by the separating band. However, the present invention is not limited to this example. By way of example, the carpool lane and the normal lane may be separated by a traffic lane line.

Further the navigation device 100 according to the first embodiment above may be provided with a camera 11 (the dotted line in FIG. 1) for imaging a road surface.

On this occasion, the camera 11 takes an image of the road surface where the moving object is traveling. By way of example, the camera 11 takes an image of a mark (e.g., a lozenge-shaped mark) indicating that the lane is the carpool lane.

The guidance point information setting part 105 determines whether or not the moving object is traveling on the carpool lane, according to the road surface image obtained by the camera 11. Then, when it is determined that the moving object is traveling on the carpool lane, the guidance point information setting part 105 performs the processing of the step S103 and S104 described above.

Further in the first embodiment above, the guidance point change process is started at the timing when the route guidance is started. However, the present invention is not limited to this example. By way of example, the guidance point change process may be performed prior to starting the route guidance. In this case, the process of the step S101 above is skipped. Then, in the step S102, the guidance point information setting part 105 acquires all the records 415 included in the guidance point information 400. Then, the guidance point information setting part 105 specifies a guidance point targeted for the change, prior to starting the route guidance, and changes the guidance point to the position before the point configured in the initial setting.

Further in the first embodiment above, there are used six conditions from the first to the sixth, as the conditions for determining whether or not the lane change is easy. However, the present invention is not limited to this example. By way of example, the lane change may be determined as not easy, if the weather is bad. It is to be noted that whether the weather is good or bad may be determined according to the condition whether the wipers are turned on or not.

Second Embodiment

Next, one example of the second embodiment of the present invention will be explained with reference to the drawings.

Figure 8:
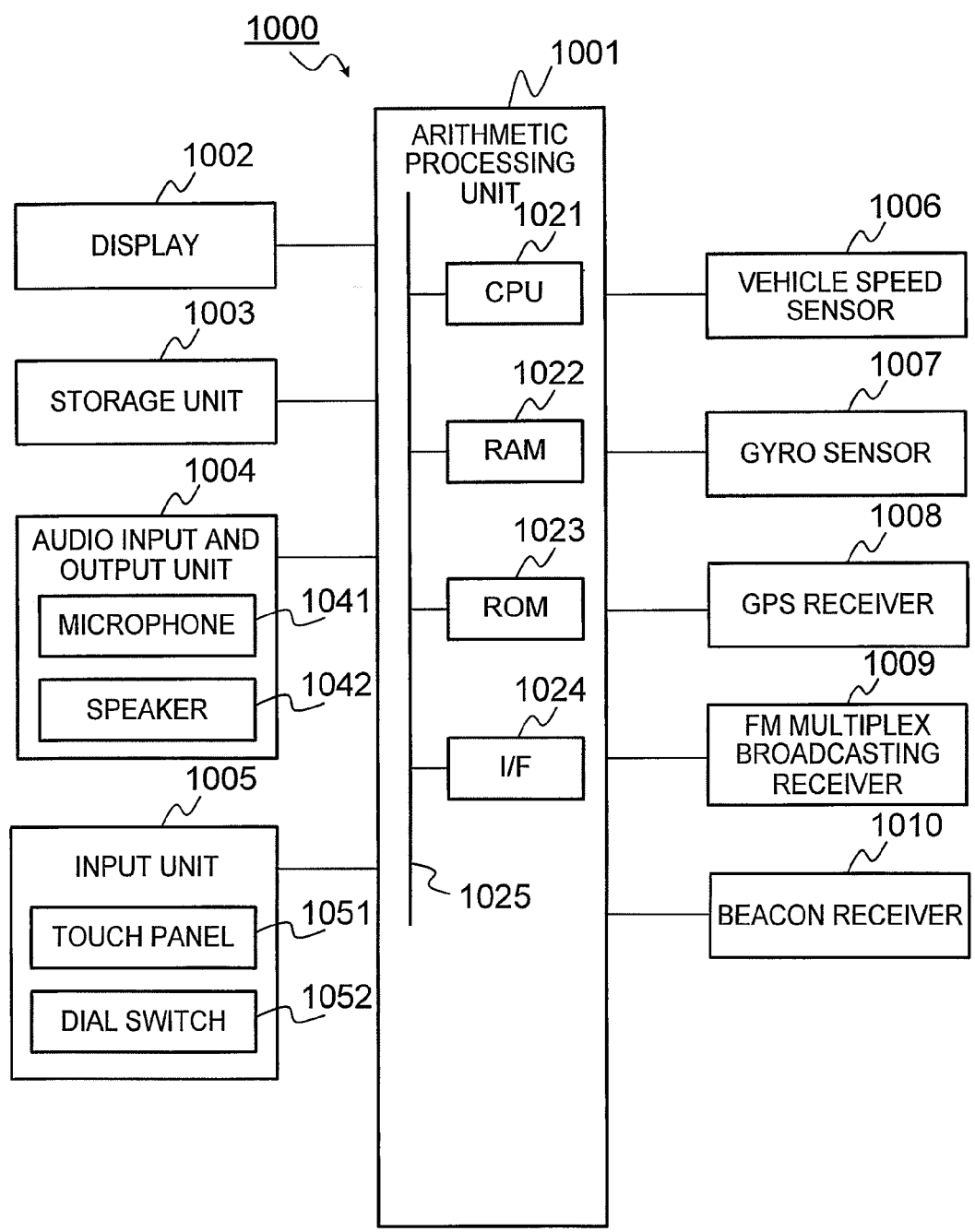
FIG. 8 is a schematic block diagram showing the navigation device relating to a second embodiment.

FIG. 8 is a schematic block diagram showing the navigation device 1000 relating to the second embodiment of the present invention. As illustrated, the navigation device 1000 is provided with an arithmetic processing unit 1001, a display 1002, a storage unit 1003, an audio input and output unit 1004 (a microphone 1041 and a speaker 1042), an input unit 1005 (a touch panel 1051 and a dial switch 1052), a vehicle speed sensor 1006, a gyro sensor 1007, a GPS receiver 1008, an FM multiplex broadcasting receiver 1009, and beacon receiver 1010. The navigation device 1000 may be a car navigation device mounted on a vehicle, or a portable terminal such as a mobile phone and a PDA.

The arithmetic processing unit 1001 is a main unit for performing various processing. By way of example, the arithmetic processing unit 1001 includes a CPU (Central Processing Unit) 1021 for executing various processing such as numerical processing and a control of each device, RAM (Random Access Memory) 1022 for storing map data and operation data being read from the storage unit 1003, ROM (Read Only Memory) 1023 for storing programs and data, an I/F (interface) 1024 for establishing connection between the arithmetic processing unit 1001 and various hardware. Then, the arithmetic processing unit 1001 has a configuration that one device is connected to another mutually via a bus 1025. Functional parts (1101 to 1106) described below are implemented by executing programs which the CPU 1021 reads into a memory such as the RAM 1022.

By way of example, the arithmetic processing unit 1001 calculates a current position based on information outputted from various sensors (1006, 1007) and from the GPS receiver 1008. On the basis of the current position being obtained, the arithmetic processing unit 1001 reads out from the storage unit 1003, map data necessary to create a display. Furthermore, the arithmetic processing unit 1001 graphically expands the map data being read out, and displays the data on the display 1002 in such a manner as superimposing thereon a current position mark (or a moving object mark representing a position of the moving object). The arithmetic processing unit 1001 uses the map data stored in the storage unit 1003 to retrieve an optimum route (hereinafter, referred to as a "recommended route") connecting a departure place (or the current position calculated in the arithmetic processing unit 1001) with a destination, which are designated by the user. It further uses the speaker 1042 of the audio input and output unit 1004 and the display 1002 to guide the user.

The display 1002 is a unit for displaying the graphics information generated by the arithmetic processing unit 1001. The display 1002 is made up of a liquid crystal display or an organic EL (Electro-Luminescence) display.

The storage unit 1003 is made up of a storage medium such as a CD-ROM, a DVD-ROM, an HDD, and an IC card. This storage medium stores map data 1310, audio data, video data, and the like, for instance.

Figure 9:
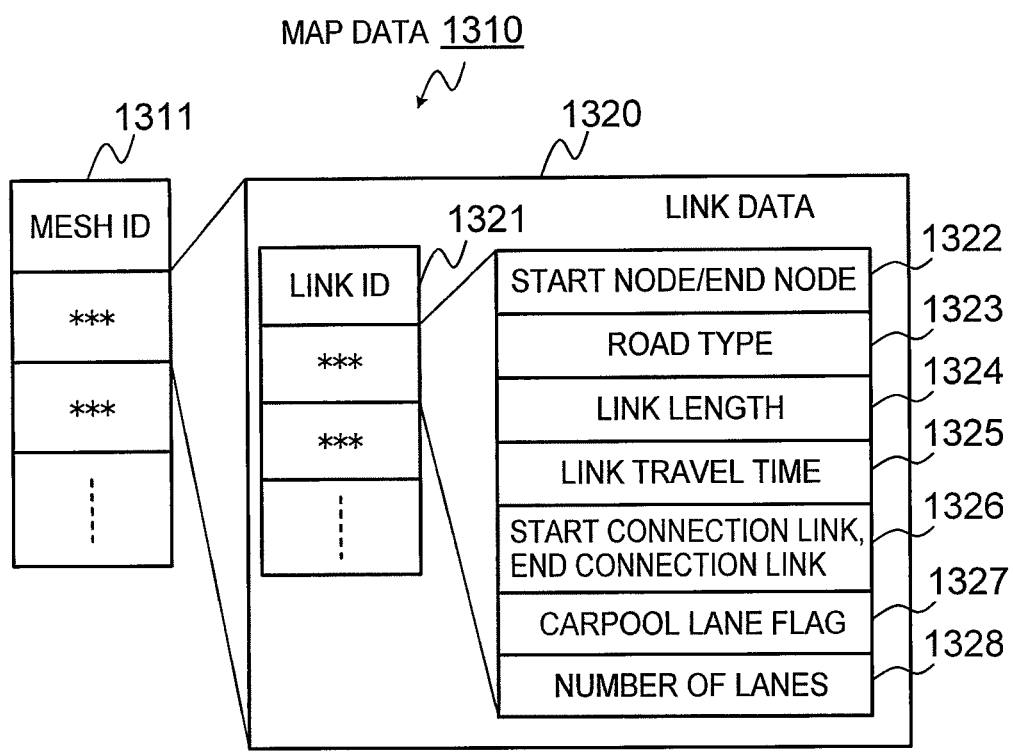
FIG. 9 illustrates the schematic data structure of map data relating to the second embodiment.

FIG. 9 illustrates a schematic data structure of map data 1310. As illustrated, the map data 1310 includes link data 1320 with respect to each identification code (mesh ID) 1311 indicating a mesh being a region partitioned on the map, the link data representing each link constituting a road included in the mesh region.

The link data 1320 includes with respect to each link identification code (link ID) 1321, coordinate information 1322 of two nodes (a start node and an end node) constituting the link, a road type 1323 indicating type information of the road including the link, link length information 1324 indicating a length of the link, a link travel time 1325, identification codes of links respectively connecting to the two nodes (connection link ID) 1326, a carpool lane flag 1327 indicating whether or not the road including the link is a carpool lane (or a road along which the carpool lane is provided), the number of lanes 1328 indicating how many lanes are provided on the road including the link, and the like. It is to be noted here that there is a distinction between the start node and the end node being the two nodes constituting a link, thereby allowing up-line and down-line of the road to be managed as links different from each other.

Here, referring to FIG. 8 again, the audio input and output unit 1004 is provided with the microphone 1041 as an audio input unit and the speaker 1042 as an audio output unit. The microphone 1041 captures audio data, such as voice of a driver and other passengers. The speaker 1042 outputs an audio signal generated by the arithmetic processing unit 1001. The microphone 1041 and the speaker 1042 are separately mounted on predetermined portions of the vehicle.

The input unit 1005 is a unit for accepting a directive from the user. The input unit 1005 is made up of the touch panel 1051, the dial switch 1052, and other hard switches (not illustrated) such as a scroll key and a scaling key. The input unit 1005 further includes a remote controller which is capable of remotely providing an operation instruction to the navigation device 1000. The remote controller is provided with a dial switch, a scroll key, a scaling key, and the like, allowing information obtained by operating each of the keys and switches to be transmitted to the navigation device 1000.

The touch panel 1051 is an operation panel being a transparent type, to be attached on a display surface of the display 1002. The touch panel 1051 is used to specify a touch position in association with XY coordinates of the image displayed on the display 1002, convert the touch position to coordinates, and output coordinates. The touch panel 1051 is made up of pressure-sensitive type or electrostatic type input detecting elements, or the like.

The dial switch 1052 is constructed in rotatable manner, both in the clockwise direction and in the anti-clockwise direction, issues a pulse signal according to a rotation by a predetermined angle, and outputs the pulse signal to the arithmetic processing unit 1001. The arithmetic processing unit 1001 obtains a rotation angle of the dial switch 1052 based on the number of the pulse signals.

The vehicle speed sensor 1005, the gyro sensor 1007, and the GPS receiver 1008 are used to detect a current position (location of one's own vehicle) and the like, of a moving object (the navigation device 1000). The vehicle speed sensor 1006 is a sensor for outputting vehicle speed data that is used to calculate a vehicle speed. The gyro sensor 1007 is made up of an optical fiber gyroscope, a vibrating gyroscope, or the like, to detect an angular rate according to a rotation of the moving object. The GPS receiver 1008 receives a signal from a GPS satellite, measures a distance between the moving object and the GPS satellite, and a rate of change of the distance, with respect to at least three satellites, thereby obtaining the current position and a traveling speed of the moving object.

The FM multiplex broadcasting receiver 1009 receives an FM multiplex broadcasting signal that is transmitted from an FM multiplex broadcasting station. The FM multiplex broadcasting information includes brief current traffic information, information on restrictions, SA/PA (service area/parking area) information, parking lot information, and the like, according to the VICS (Vehicle Information Communication System: registered trademark), and character information and the like, such as weather information, provided by a radio station as FM multiplex general information.

The beacon receiver 1010 receives traffic congestion information, information on restrictions, SA/PA information, parking lot information, and the like, transmitted from beacons.

Figure 10:
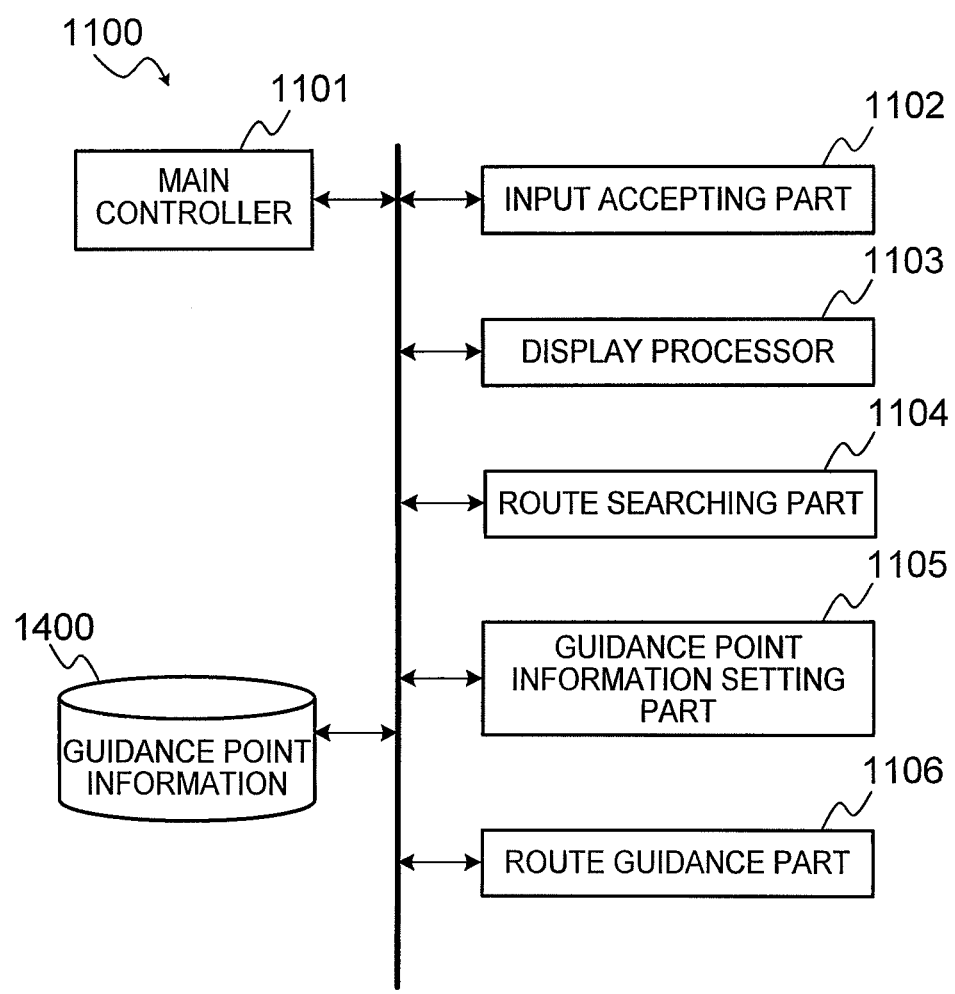
FIG. 10 is a functional block diagram of the arithmetic processing unit relating to the second embodiment.

FIG. 10 is a functional block diagram of the arithmetic processing unit 1001. As illustrated, the arithmetic processing unit 1001 includes a main controller 1101, an input accepting part 1102, a display processor 1103, a route searching part 1104, a guidance point information setting part 1105, and a route guidance part 1106.

The main controller 1101 performs processing for overall control of each of the parts in the arithmetic processing unit 1001. The main controller 1101 manages various setting information provided in the navigation device 1000. By way of example, the main controller 1101 accepts from the user via the input accepting part 1102, information to be set as the various setting information, and stores the information at a predetermined position in the storage unit 1003. It is to be noted that the main controller 1101 accepts as the various setting information, information relating to usage of the carpool lane (e.g., a true or false result regarding positive usage of the carpool lane), and stores the result in the storage unit 1003. Upon accepting a request to provide the various setting information from other unit, the main 1101 transfers the various setting information to the unit which sent the request.

The input accepting part 1102 accepts a request from the user inputted in the input unit 1005, analyzes descriptions of the request, and notifies the main controller 1101 of the data responding to the result of the analysis. For example, the input accepting part 1102 accepts a request for power-on or power-off of the navigation device 1000, and notifies the main controller 1101 of the request. The input accepting part 1102 further accepts input data regarding settings of various functions (e.g., setting of a departure place and a destination) held by the navigation device 1000, and notifies the main controller 1101 of the input data.

The display processor 1103 displays on the display 1002, a map, a recommended route being retrieved, various messages given to the user, and the like. Specifically, the display processor 1103 generates a drawing command to make a display on the display 1002 and it is notified. It is to be noted that, upon displaying the map on the display 1002, the display processor 1103 extracts from the storage unit 1003, the map data of the area requested to be displayed (for example, an area necessary for displaying the entire recommended route), generates a map drawing command in a designated drawing format, so as to depict roads, other map structural objects, the current position, the destination, the recommended route, and the like, and notifies the main controller 1101 of the map drawing command. The display processor 1103 further generates a command to display a vehicle mark indicating the position of the vehicle, and various setting screens, on the map being displayed on the display 1002, and notifies the main controller 1101 of the command.

The route searching part 1104 performs a process for searching for a recommended route. Then, the route searching part 1104 retrieves a route which minimizes cost of the route (e.g., total distance and total travel time) connecting designated two points (the departure place and the destination), by using Dijkstra's Algorithm or the like. On this occasion, the route searching part 1104 stores in the memory such as the RAM 1022, an identification code (link ID) 1321 of each link that constitutes the recommended route being retrieved, establishing associations between the link IDs and the links respectively.

The guidance point information setting part 1105 configures a setting as to a point (hereinafter referred to as "guidance point") for outputting guidance information to guide the moving object (vehicle). Specifically, the guidance point information setting part 1105 generates guidance point information 1400 regarding the guidance point, after retrieving a route before guiding along the route, and stores the guidance point information in the memory such as the RAM 1022. It is to be noted that setting of the guidance point performed for the first time after retrieving the route will be referred to as "initial setting" in the following.

FIG. 11 illustrates a schematic data structure of the guidance point information 1400. As illustrated, the guidance point information 1400 is made up of a record 1415 with respect to each guidance point 1413. Each record 1415 stores a guidance sequence 1411, a link ID 1412, a guidance point 1413, and guidance information 1414, in such a manner as establishing association among those items.

Here, the guidance sequence 1411 is data indicating the sequence for outputting the guidance information 1414 on the recommended route, from the departure place or the current position to the destination on the recommended route. The link ID 1412 is an identification code of the link where the guidance point 1413 is located. The guidance point 1413 is coordinate data which specifies a position of the guidance point. The guidance information 1414 includes audio data or image data, and it is data for outputting a message such as "You will be soon arriving at the expressway exit". There is further stored in the guidance information 1414, as attribute information, character data such as "entrance" and "exit", in association with the audio data or the image data.

The guidance point information setting part 1105 changes a guidance point 1413 being a target for the change, in the situation where the change of lanes is not easy on the road where the carpool lane is provided. By way of example, the guidance point information setting part 1105 deletes the guidance point configured in the initial setting, to modify the setting not to output (announce) the guidance information. Specific processing (guidance point change process) regarding the change of the guidance point 1413 will be explained later.

The route guidance part 1106 performs the route guidance using the recommended route retrieved by the route searching part 1104. By way of example, the route guidance part 1106 displays (highlights) the recommended route included in the range of the map shown on the display 1002 via the display processor 1103. On this occasion, the route guidance part 1106 displays on the recommended route, a moving object mark (car mark) indicating the current position of the moving object (vehicle).

The route guidance part 1106 outputs (displays, or outputs using sounds) predetermined guidance information, every time when the moving object reaches the guidance point being set. Specifically, when the current position coincides (or approximately coincides) with the guidance point 1413 stored in the guidance point information 1400, the route guidance part 1106 outputs the guidance information 1414 which is associated with the guidance point 1413. Accordingly, the route guidance part 1106 is allowed to show on the display 1102 and inform the user using sounds via the speaker 1042 of the audio input and output device 1004, whether the user should go straight, or turn to the left of to the right, before (e.g., 300 meters before) passing a point requiring the guidance (e.g., a major intersection, a point for entering the carpool lane, a branching point of an expressway, or the like).

Next, an explanation will be made as to a characteristic operation of the navigation device 1000 having the configuration as described above.

<Guidance Point Change Process>

Figure 12:
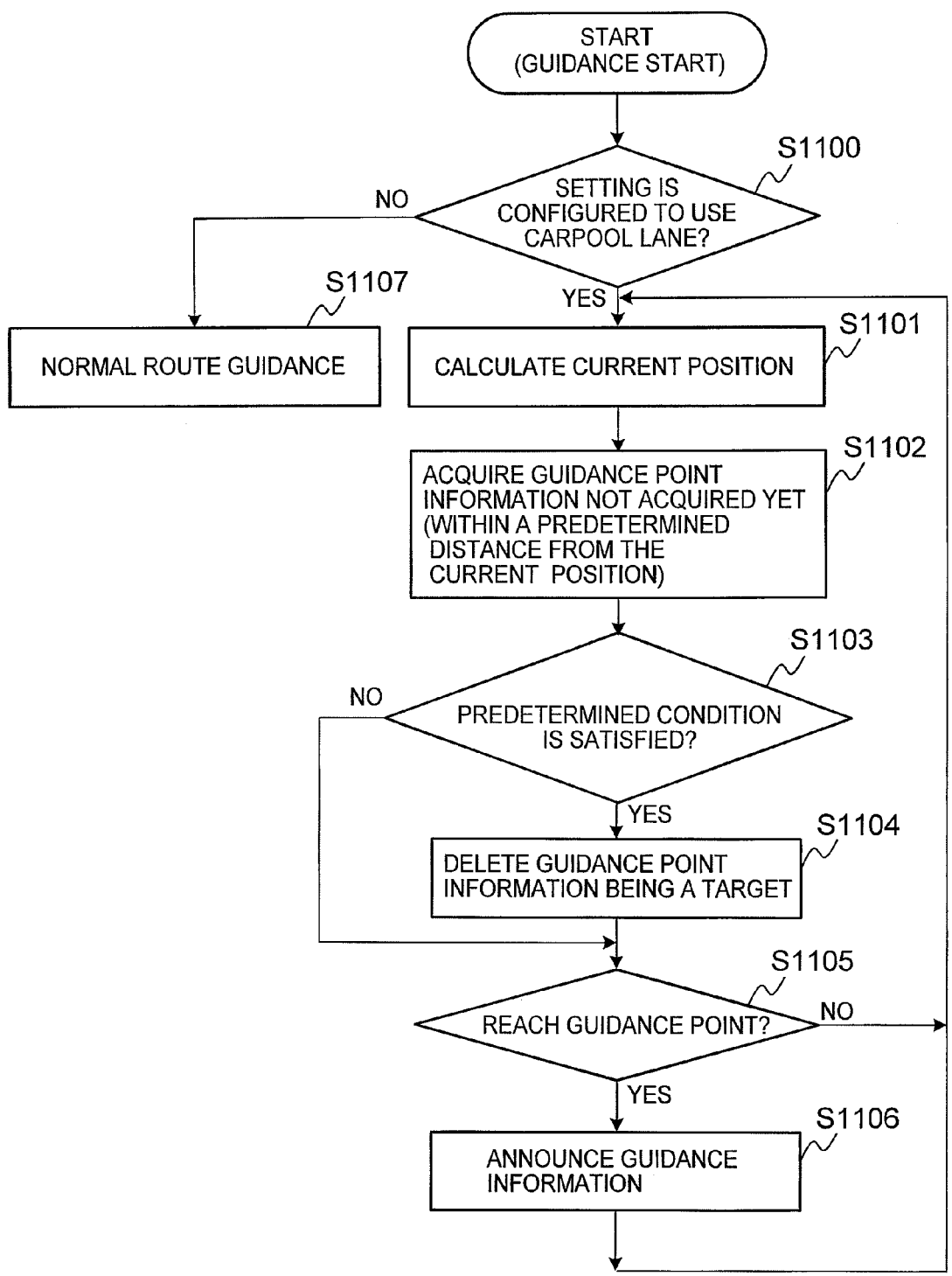
FIG. 12 is a flow chart showing the guidance point change process relating to the second embodiment.

FIG. 12 is a flow chart showing the guidance point change process performed by the navigation device 1000.

The guidance point information setting part 1105 of the arithmetic processing unit 1001 starts the guidance point change process at the timing when the route guiding part 1106 starts the route guidance.

Firstly, the route guidance part 1106 determines whether or not there is a setting to use the carpool lane in the navigation device 1000 (step S1100). Specifically, the route guidance part 1106 acquires from the main controller 1101, information as to the usage of the carpool lane (e.g., information of a true or false result being set regarding the usage of the carpool lane), out of various setting information provided in the navigation device 1000. Then, if the acquired information includes information indicating the carpool lane is used (true), the route guidance part 1106 determines that there is a setting that the carpool lane is used. On the other hand, if the acquired information includes information indicating the carpool lane is not used (false), the route guidance part 1106 determines that there is a setting that the carpool lane is not used.

Upon determining that there is a setting that the carpool lane is used (step S1100; Yes), the route guidance part 1106 shifts the process to the step S1101. On the other hand, if the route guidance part 1106 determines that there is a setting that the carpool lane is not used (step S1100; No), the process shifts to the step S1107, and normal route guidance is performed (for the case where the carpool lane is not used).

When the process shifts to the step S1101, the route guidance part 1106 calculates the current position of the moving object (vehicle) (step S1101). By way of example, the route guidance part 1106 uses the vehicle speed data outputted from the vehicle speed sensor 1006, an angular rate detected by the gyro sensor 1007, and the like, so as to calculate the current position of the moving object. The route guidance part 1106 further uses data outputted from the GPS receiver 1008 to modify the current position.

Then, the guidance point information setting part 1105 acquires the guidance point information (record 1415) of the guidance point which exists within a predetermined distance from the current position and not acquired yet (step S1102). By way of example, the guidance point information setting part 1105 refers to the guidance point information 1400, and specifies a record 1415 having the guidance point 1413 within a predetermined distance (e.g., 3 km) from the current position that is calculated in the step S1101. Then, the guidance point setting information setting part 1105 reads the record 1415 not acquired yet (not read out into the memory such as the RAM 1022), out of the records 1415 being specified. It is to be noted that the guidance point information setting part 1105 reads the record 1415 according to the sequence indicated by the guidance sequence 1411.

Next, the guidance point information setting part 1105 determines the present situation, whether or not the change of lanes is not easy on the road where the carpool lane is provided (step S1103).

Figure 13:
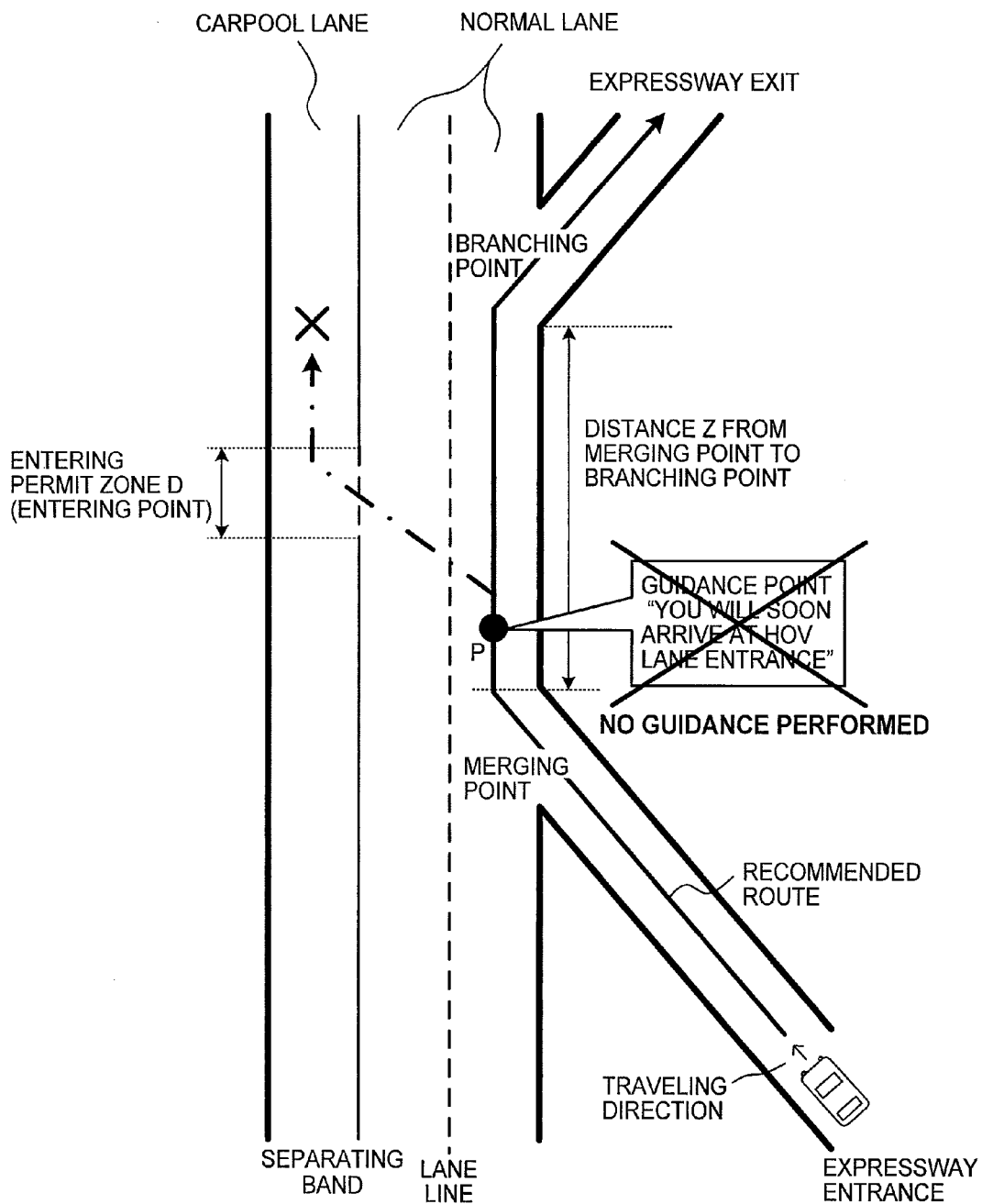
FIG. 13 is a schematic diagram showing an expressway (in the vicinity of the expressway exit and entrance) where the carpool lane is provided.

FIG. 13 is a schematic diagram showing an expressway (in the vicinity of expressway entrance and exit) where the carpool lane is provided. In the illustrated example, one carpool lane is provided in such a manner as parallel with two lanes (normal lanes) on the expressway. Here, the carpool lane and the normal lanes are separated by a separating band. Therefore, the vehicle traveling along the carpool lane is allowed to enter the carpool lane, only from a particular zone. By way of example, the zone which permits the vehicle to enter the carpool lane from the normal lane is provided for each expressway entrance, at least one (entering permit zone D).

Here, in the situation where the change of lanes on the normal lanes is easy, the moving object (driver) is allowed to travel easily along the guided route on the expressway where the carpool lane is provided. However, in the situation where the change of lanes on the normal lanes is not easy, it is sometimes difficult to travel along the guided route. By way of example, traveling along the guided route is difficult in the case where the carpool lane is used only for a short period (a short distance). In such a case, the moving object (driver) may be required to change the lanes over and over, within a short distance section, upon entering the carpool lane and leaving the carpool lane. In this situation, it is better to guide the moving object (driver) not to use the carpool lane, so as to travel along the guided route easily.

However, the guidance point 1413 is set a predetermined distance (e.g., 300 m) before a point (e.g., an intersection) which requires guidance, regardless of the degree of easiness for changing the lanes. Therefore, if the guidance information 1414 is outputted at the guidance point 1413 which is set according to the initial setting, the moving object (driver) may not be able to travel along the guided route.

Therefore, the guidance point information setting part 1105 according to the present embodiment shifts the process to the step S1104 and changes the setting not to perform guidance (output of guidance information) at the guidance point Q set in the initial setting, in the situation where the change of lanes having the carpool lane is not easy. On the other hand, in the situation where the change of lanes having the carpool lane is easy, the guidance point information 1400 is not changed, and the process shifts to the step S1105 without any change.

Hereinafter, a specific process in the step S1103 will be explained.

The guidance point information setting part 1105 determines that the situation indicates the lane change is not easy, when a predetermined condition is satisfied. On the other hand, if the predetermined condition is not satisfied, it is determined that the situation indicates that the lane change is easy.

Here, the predetermined condition is assumed as a situation that, for instance, the distance Z from the merging point to the branching point as shown in FIG. 13 is shorter than the first distance (e.g., 1 km).

It is to be noted here that even though the condition above is not satisfied, if the distance Z from the merging point to the branching point is equal to or more than a first distance and less than a second distance (e.g., 2 km), and the number of lanes of the expressway (normal lane) is equal to or more than a predetermined number (e.g., 3 lanes), it is possible to determine that the predetermined condition is satisfied.

In addition, even though the condition above is satisfied, if the traffic on the expressway (normal lanes) is congested, it is not determined that the predetermined condition is satisfied.

In other words, in the step 1103, the guidance point information setting part 1105 refers to the carpool lane flag 1327 of the link data 1320 and specifies a carpool lane link and by using this link, calculates the distance Z from the merging point to the branching point.

The guidance point information setting part 1105 refers to the carpool lane flag 1327 and the number of lanes 1328 of the link data 1320, and specifies the number of lanes on the road (expressway) where the carpool lane is provided.

In addition, the guidance point information setting part 1105 uses the FM multiplex broadcasting receiver 1009 and the beacon receiver 1010 to acquire traffic congestion information (including restriction information) within an area (an area including from the departure place to the destination) which is a target for the route search. Along with this processing, the guidance point information setting part refers to the carpool lane flag 1327 of the link data 1320 to specify a carpool lane link. Then, it uses the traffic congestion information being acquired and the link being specified to determine whether or not the traffic on the road (expressway) provided with the carpool lane is congested.

Then, the guidance point information setting part 1105 uses the distance Z, the number of lanes, information whether the traffic is congested or not, to determine in a comprehensive manner, whether or not the predetermined condition is satisfied.

When the process shifts to the step S1104, the guidance point information setting part 1105 determines that the guidance is not performed (the guidance information is not outputted) at the guidance point Q, being configured in the initial setting (step S1104). By way of example, the guidance point information setting part 1105 searches the guidance point information (records 1415) acquired in the step S1102 for the guidance information 1414 having the character data "entrance" as the attribute information. Then, the guidance point 1413 associated with the guidance information 1414 being retrieved is specified as the guidance point being a target for deletion. Here, the guidance point information setting part 1105 deletes the record 1415 including the specified guidance point 1413 being the target for deletion, from the guidance point information 1400.

After deleting the guidance point 1413 (record 1415), the guidance point information setting part 1105 shifts the process to the step S1105.

When the process shifts to the step S1105, the route guidance part 1106 determines whether or not the moving object (vehicle) has reached the guidance point (step S1105). By way of example, the route guidance part 1106 compares the current position calculated in the step S1101 with the already-set guidance point (the guidance point 1413 stored in the guidance point information 1400). Then, if the current position coincides with (approximately coincides with) the guidance point, it is determined that the moving object has reached the guidance point. On the other hand, if the current position does not coincide with the guidance point, it is determined that the moving object has not reached the guidance point yet.

If it is determined that the moving object has not reached the guidance point (step S1105; No), the route guidance part 1106 returns the processing to the step S1101. On the other hand, when it is determined that the moving object has reached the guidance point (step S1105; Yes), the route guidance part 1106 shifts the process to the step S1106.

When the process shifts to the step S1106, the route guidance part 1106 announces the user the guidance information regarding the guidance point that the moving object has reached (step S1106). Specifically, the route guidance part 1106 reads the guidance information 1414 being associated with the guidance point 1413 which the moving object has reached, and shows the information on the display 1002 together with an audio output from the speaker 1042.

Then, the route guidance part 1106 returns the processing to the step S1101. The arithmetic processing unit 1001 repeatedly executes this flow until the route guidance is completed.

The arithmetic processing unit 1101 performs the processing above, thereby allowing the navigation device 1000 of the present embodiment not to perform the guidance at the guidance point Q that is configured by the initial setting, as shown in FIG. 13. Consequently, the moving object (driver) is able to travel along the guided route safely, even in the situation that the change of lanes is not easy.

It is to be noted that the present invention is not limited to the second embodiment above, and various modifications and applications are available.

By way of example, the second embodiment is explained, assuming the road provided with the carpool lane as an expressway. However, the present invention is not limited to this example. For instance, the road provided with the carpool lane may be a normal road.

In the second embodiment, the branching point is assumed as a point directing to an exit from the expressway (normal lane) (an expressway exit). However, the present invention is not limited to this example. By way of example, the branching point may be a junction, an intersection, or the like.

Similarly, the merging point of the second embodiment above may be a junction, an intersection, or the like.

In the second embodiment, the carpool lane and the normal lane are separated by the separating band. However, the present invention is not limited to this example. By way of example, the carpool lane is separated from the normal lane by a traffic lane line.

Further in the second embodiment, the guidance point change process is started at the timing when the route guidance is started. However, the present invention is not limited to this example. By way of example, the guidance point change process may be performed prior to starting the route guidance. On this occasion, the process in the step S1101 described above may be skipped. Then, in the step S1102, the guidance point information setting part 1105 acquires all the records 1415 included in the guidance point information 1400. The processing above allows the guidance point information setting part 1105 to specify the guidance point as a target for deletion prior to starting the route guidance, and delete the guidance point.

Further in the second embodiment, following conditions are used for determining whether or not the lane change is easy; the distance Z from the merging point to the branching point, the number of lanes, and the traffic is congested or not. However, the present invention is not limited to this example. By way of example, if the weather is bad, it may be determined that the lane change is not easy. It is to be noted that the weather is good or bad may be determined according to the condition whether the wipers are turned on or not, for instance.

EXPLANATION OF REFERENCES

First Embodiment Described Above

1 . . . ARITHMETIC PROCESSING UNIT, 2 . . . DISPLAY, 3 . . . STORAGE UNIT, 4 . . . AUDIO INPUT AND OUTPUT UNIT, 5 . . . INPUT UNIT, 6 . . . VEHICLE SPEED SENSOR, 7 . . . GYRO SENSOR, 8 . . . GPS RECEIVER, 9 . . . FM MULTIPLEX BROADCASTING RECEIVER, 10 . . . BEACON RECEIVER, 21 . . . CPU, 22 . . . RAM, 23 . . . ROM, 24 . . . INTERFACE (I/F), 41 . . . MICROPHONE, 42 . . . SPEAKER, 51 . . . TOUCH PANEL, 52 . . . DIAL SWITCH, 100 . . . NAVIGATION DEVICE, 101 . . . MAIN CONTROLLER, 102 . . . INPUT ACCEPTING PART, 103 . . . DISPLAY PROCESSOR, 104 . . . ROUTE SEARCHING PART, 105 . . . GUIDANCE POINT INFORMATION SETTING

PART, 106 . . . ROUTE GUIDANCE PART, 310 . . . MAP DATA, 311 . . . MESH ID, 320 . . . LINK DATA, 321 . . . LINK ID, 322 . . . START NODE/END NODE, 323 . . . ROAD TYPE, 324 . . . LINK LENGTH, 325 . . . LINK TRAVEL TIME, 326 . . . START CONNECTION LINK/END CONNECTION LINK, 327 . . . CARPOOL LANE FLAG, 328 . . . NUMBER OF LANES, 400 . . . GUIDANCE POINT INFORMATION, 411 . . . GUIDANCE SEQUENCE, 412 . . . LINK ID, 413 . . . GUIDANCE POINT, 414 GUIDANCE INFORMATION, 415 . . . RECORD

Second Embodiment Described Above

1000 . . . NAVIGATION DEVICE, 1001 . . . ARITHMETIC PROCESSING UNIT, 1002 . . . DISPLAY, 1003 . . . STORAGE UNIT, 1004 . . . AUDIO INPUT AND OUTPUT UNIT, 1005 . . . INPUT UNIT, 1006 . . . VEHICLE SPEED SENSOR, 1007 . . . GYRO SENSOR, 1008 . . . GPS RECEIVER, 1009 . . . FM MULTIPLEX BROADCASTING RECEIVER, 1010 . . . BEACON RECEIVER, 1021 . . . CPU, 1022 . . . RAM, 1023 . . . ROM, 1024 . . . INTERFACE (I/F), 1041 . . . MICROPHONE, 1042 . . . SPEAKER, 1051 . . . TOUCH PANEL, 1052 . . . DIAL SWITCH, 1101 . . . MAIN CONTROLLER, 1102 . . . INPUT ACCEPTING PART, 1103 . . . DISPLAY PROCESSOR, 1104 . . . ROUTE SEARCHING PART, 1105 . . . GUIDANCE POINT INFORMATION SETTING PART, 1106 . . . ROUTE GUIDANCE PART, 1310 . . . MAP DATA, 1311 . . . MESH ID, 1320 . . . LINK DATA, 1321 . . . LINK ID, 1322 . . . START NODE/END NODE, 1323 . . . ROAD TYPE, 1324 . . . LINK LENGTH, 1325 . . . LINK TRAVEL TIME, 1326 . . . START CONNECTION LINK/END CONNECTION LINK, 1327 . . . CARPOOL LANE FLAG, 1328 . . . NUMBER OF LANES, 1400 . . . GUIDANCE POINT INFORMATION, 1411 . . . GUIDANCE SEQUENCE, 1412 . . . LINK ID, 1413 . . . GUIDANCE POINT, 1414 . . . GUIDANCE INFORMATION, 1415 . . . RECORD

What is claimed is:

1. A navigation device comprising:
a current position calculation unit configured to calculate a current position of a moving object,
a recommended route search unit configured to search for a recommended route to a destination,
a guidance point setting unit configured to set a guidance point, at which guidance information to guide the moving object is output, on the recommended route a first distance before a point where guidance becomes necessary, and
a guidance information announcing unit configured to display on a screen or output from a speaker the guidance information, when a moving object reaches the set guidance point, wherein,
when a distance between a leaving point where the moving object should exit carpool lanes and a branching point where a road with carpool lanes branches off is shorter than a predetermined distance, the guidance point setting unit sets the guidance point to a second distance that is shorter than the first distance before the point where guidance becomes necessary.

2. The navigation device according to claim 1, wherein, the guidance point setting unit sets the guidance point to the second distance, in the case where the number of lanes on the road provided with the carpool lane is equal to or more than a predetermined number.

3. The navigation device according to claim 1, further comprising a traffic congestion information acquiring unit configured to acquire traffic congestion information, wherein,
the guidance point setting unit sets the guidance point to the second distance in the case where traffic is congested on the road provided with the carpool lane.

4. The navigation device according to claim 1, further comprising,
an imaging unit configured to take an image of a road surface of a lane on which a moving object is traveling, and
a lane determining unit configured to determine whether or not the moving object is traveling on the carpool lane,
when the distance between the leaving point where the moving object should exit carpool lanes and the branching point where the road with carpool lanes branches off is shorter than the predetermined distance, the guidance point setting unit sets the guidance point to a given distance before guidance point has been set.

5. A route guidance method in a navigation device, comprising:
a current position calculating step of calculating, by a calculation unit, a current position of a moving object,
a recommended route searching step of searching, by a route search unit, for a recommended route to a destination,
a guidance point setting step of setting, by a setting unit, a guidance point, at which guidance information to guide the moving object is output, on the recommended route a first distance before a point where guidance becomes necessary, and
a guidance information announcing step of displaying on a screen or outputting from a speaker the guidance information, when a moving object reaches the set guidance point, wherein,
when a distance between a leaving point where the moving object should exit carpool lanes and a branching point where a road with carpool lanes branches off is shorter than a predetermined distance, the guidance point setting step sets the guidance point to a second distance that is shorter than the first distance before the point where guidance becomes necessary.

6. A navigation device comprising:
a current position calculation unit configured to calculate a current position of a moving object,
a recommended route search unit configured to search for a recommended route to a destination,
a guidance point setting unit configured to set a guidance point, at which guidance information to guide the moving object is output, on the recommended route a first distance before a point where guidance becomes necessary, and
a guidance information announcing unit configured to display on a screen or output from a speaker the guidance information, when a moving object reaches the set guidance point, wherein,
when a distance between a merging point where the moving object merges over a road with carpool lanes and an entering point where the moving object enters into carpool lanes is shorter than a predetermined distance, the guidance point setting unit sets the guidance point to a second distance that is shorter than the first distance before the point where guidance becomes necessary.

7. A navigation device comprising:
a current position calculation unit configured to calculate a current position of a moving object, a recommended route search unit configured to search for a recommended route to a destination, a guidance point setting unit configured to set a guidance point, at which guidance information to guide the moving object is output, on the recommended route a first distance before a point where guidance becomes necessary, and a guidance information announcing unit configured to display on a screen or output from a speaker the guidance information, when a moving object reaches the set guidance point, wherein, when a distance between a merging point where the moving object merges over a road with carpool lanes and a branching point where a road with carpool lanes branches off is shorter than a predetermined distance, the guidance point setting unit does not display on a screen or output from a speaker the guidance information.

8. The navigation device according to claim 7, wherein, the guidance point setting unit does not display on a screen or output from a speaker the guidance information when the distance between the merging point and the branching point is equal to or longer than the predetermined distance but shorter than a second distance, and the number of lanes on the road is equal to or more than a predetermined number.

9. The navigation device according to claim 7, further comprising a traffic congestion information acquiring unit configured to acquire traffic congestion information, wherein, when traffic is congested on a route from the merging point to the branching point even though the distance between the merging point and the branching point is shorter than the predetermined distance, the guidance point setting unit configures a setting to display on a screen or output from a speaker the guidance information at the set guidance point.

10. A route guidance method in a navigation device, comprising:

a current position calculating step of calculating a current position of a moving object, a recommended route searching step of searching for a recommended route to a destination, a guidance point setting step of setting a guidance point, at which guidance information to guide the moving object is output, on the recommended route a first distance before a point where guidance becomes necessary, and a guidance information announcing step of displaying on a screen or outputting from a speaker the guidance information, when a moving object reaches the set guidance point, wherein, when a distance between a merging point where the moving object merges over a road with carpool lanes and a branching point where a road with carpool lanes branches off is shorter than a predetermined distance, the guidance point setting step does not display on a screen or output from a speaker the guidance information.

11. A route guidance method in a navigation device, comprising:

a current position calculating step of calculating, by a calculation unit, a current position of a moving object, a recommended route searching step of searching, by a route search unit, for a recommended route to a destination, a guidance point setting step of setting, by a setting unit, a guidance point, at which guidance information to guide the moving object is output, on the recommended route a first distance before a point where guidance becomes necessary, and a guidance information announcing step of displaying on a screen or outputting from a speaker the guidance information, when a moving object reaches the guidance point wherein, when a distance between a merging point where the moving object merges over a road with carpool lanes and an entering point where the moving object enters into carpool lanes is shorter than a predetermined distance, the set guidance point is set to a second distance that is shorter than the first distance before the point where guidance becomes necessary.

* * * * *